US009319935B2

(12) United States Patent
Fischer

(10) Patent No.: US 9,319,935 B2
(45) Date of Patent: Apr. 19, 2016

(54) HANDOVER METHOD WITH LINK FAILURE RECOVERY, WIRELESS DEVICE AND BASE STATION FOR IMPLEMENTING SUCH METHOD

(75) Inventor: Patrick Fischer, Paris (FR)

(73) Assignee: LG Electronics Inc., Seoul (KR)

( * ) Notice: Subject to any disclaimer, the term of this patent is extended or adjusted under 35 U.S.C. 154(b) by 587 days.

(21) Appl. No.: 12/189,586

(22) Filed: Aug. 11, 2008

(65) Prior Publication Data

US 2009/0061878 A1 Mar. 5, 2009

Related U.S. Application Data

(60) Provisional application No. 60/955,382, filed on Aug. 12, 2007.

(51) Int. Cl.
*H04W 36/00* (2009.01)
*H04W 28/06* (2009.01)
(Continued)

(52) U.S. Cl.
CPC ............ *H04W 28/065* (2013.01); *G08C 17/02* (2013.01); *H04L 47/10* (2013.01); *H04L 47/14* (2013.01);
(Continued)

(58) Field of Classification Search
CPC .......... H04W 28/065; H04W 28/0278; H04W 28/12; H04W 72/042; H04W 72/1252; H04W 72/1284; H04W 28/06; H04W 88/02; G08C 17/02; G08C 2201/32; H04L 47/10; H04L 47/14; H04L 47/263; H04L 47/30; H04L 47/33; H04L 47/38
USPC ............. 455/436–439, 443–444, 456.5, 33.2, 455/561
See application file for complete search history.

(56) References Cited

U.S. PATENT DOCUMENTS 5,732,352 A 3/1998 Gutowski et al.
6,192,259 B1 2/2001 Hayashi
(Continued)

FOREIGN PATENT DOCUMENTS

CN 1934798 3/2007
EP 1796335 6/2007
(Continued)

OTHER PUBLICATIONS

3GPP "Universal Mobile Telecommunications System (UMTS); FDD enhanced uplink; Overall description; stage 2" ETSI TS 125 309 v6.2.0, Mar. 2005.
(Continued)

*Primary Examiner* — Keith Fang
(74) *Attorney, Agent, or Firm* — Lee Hong Degerman Kang & Waimey; Jonathan Kang; Jeffrey Lotspeich

(57) ABSTRACT

For each target cell determined by a handover decision process, a first message is transmitted from a source base station (20S) to a target base station (20T) servicing that target cell. The first message includes an identifier of a wireless device (10) having a communication link with the source base station and information for obtaining authentication data for this wireless device. The authentication data depends on a secret key available to the wireless device and the source base station and on an identity of the target cell. Upon failure of the communication link, a cell is selected at the wireless device, which transmits to that cell a reestablishment request message including its identifier and authentication data depending on the secret key and on an identity of the selected cell. If the selected cell is a target cell serviced by a target base station that received a first message, conformity of the authentication data included in the reestablishment request message with the authentication data obtained from this first message is verified to authorize transfer of the communication link to the selected cell.

13 Claims, 6 Drawing Sheets

(51) Int. Cl.

| | | |
|---|---|---|
| *G08C 17/02* | (2006.01) | |
| *H04L 12/801* | (2013.01) | |
| *H04L 12/825* | (2013.01) | |
| *H04L 12/835* | (2013.01) | |
| *H04L 12/811* | (2013.01) | |
| *H04W 28/12* | (2009.01) | |
| *H04W 72/12* | (2009.01) | |
| *H04W 28/02* | (2009.01) | |
| *H04W 72/04* | (2009.01) | |
| *H04W 88/02* | (2009.01) | |

(52) U.S. Cl.
CPC .............. *H04L 47/263* (2013.01); *H04L 47/30* (2013.01); *H04L 47/33* (2013.01); *H04L 47/38* (2013.01); *H04W 28/0278* (2013.01); *H04W 28/12* (2013.01); *H04W 72/042* (2013.01); *H04W 72/1252* (2013.01); *H04W 72/1284* (2013.01); *G08C 2201/32* (2013.01); *H04W 28/06* (2013.01); *H04W 88/02* (2013.01)

(56) References Cited

U.S. PATENT DOCUMENTS

| | | | |
|---|---|---|---|
| 6,486,809 | B1 | 11/2002 | Figoli |
| 6,763,112 | B1 | 7/2004 | Haumont |
| 7,136,395 | B2 | 11/2006 | Lupien et al. |
| 2002/0071432 | A1 | 6/2002 | Soderberg et al. |
| 2002/0097701 | A1 | 7/2002 | Lupien et al. |
| 2003/0007490 | A1 | 1/2003 | Yi et al. |
| 2004/0033801 | A1 | 2/2004 | Yi et al. |
| 2004/0052234 | A1 | 3/2004 | Ameigeiras et al. |
| 2004/0081151 | A1 | 4/2004 | Greis et al. |
| 2004/0160919 | A1 | 8/2004 | Balachandran et al. |
| 2004/0160940 | A1 | 8/2004 | Kim |
| 2004/0180675 | A1 | 9/2004 | Choi et al. |
| 2005/0033960 | A1* | 2/2005 | Vialen et al. .................. 713/170 |
| 2005/0037767 | A1 | 2/2005 | Kim et al. |
| 2005/0074024 | A1 | 4/2005 | Kim et al. |
| 2005/0201353 | A1 | 9/2005 | Lee et al. |
| 2006/0133333 | A1 | 6/2006 | Alex et al. |
| 2006/0171364 | A1 | 8/2006 | Bosch et al. |
| 2006/0187846 | A1 | 8/2006 | Pelletier et al. |
| 2006/0251027 | A1 | 11/2006 | Chun et al. |
| 2006/0276189 | A1* | 12/2006 | Kiernan et al. ............... 455/436 |
| 2007/0047582 | A1 | 3/2007 | Malkamaki |
| 2007/0060127 | A1* | 3/2007 | Forsberg ....................... 455/436 |
| 2007/0097916 | A1 | 5/2007 | Eyuboglu et al. |
| 2007/0097918 | A1 | 5/2007 | Cai et al. |
| 2008/0051091 | A1* | 2/2008 | Phan et al. .................... 455/436 |

FOREIGN PATENT DOCUMENTS

| | | |
|---|---|---|
| JP | 2002152310 | 5/2002 |
| JP | 2003-111148 | 4/2003 |
| JP | 2004515177 | 5/2004 |
| JP | 2005065298 | 3/2005 |
| JP | 2005236490 | 9/2005 |
| JP | 2006230007 | 8/2006 |
| JP | 2007502070 | 2/2007 |
| JP | 2007189697 | 7/2007 |
| JP | 2007536784 | 12/2007 |
| RU | 2280958 | 7/2006 |
| TW | 1363571 | 5/2012 |
| TW | 1377818 | 11/2012 |
| WO | 2005/115026 | 12/2005 |
| WO | 2005/120124 | 12/2005 |
| WO | 2006/118418 | 11/2006 |
| WO | 2007/052922 | 5/2007 |

OTHER PUBLICATIONS

3GPP "Technical Specification Group Radio Access Network; Evolved Universal Terrestrial Radio Access (E-UTRA) Medium Access Control (MAC) protocol specification." Release Nov. 8, 2007.

Nokia et al., "Radio Link Failure Recovery", 3GPP TSG-RAN WG2 #58, Jun. 29, 2007.

Nokia et al., "Handover Failure recovery" 3GPP TSG-RAN WG2 #58, May 11, 2007.

Qualcomm "Shared Secret for radio Link Failure Procedure", 3GPP TSG-RAN WG2 #59, Aug. 24, 2007.

Bajzik, L, et al., "Impact of Intra-LTE Handover with Forwarding on the User Connections," 2007 16Th IST Mobile and Wireless Communications Summit, pp. 1-5, Jul. 1, 2007.

Nokia Siemens Networks, et al., "Radio Link Failure Recovery," 3GPP TSG-RAN WG2 Meeting #58, R2-072382, Jun. 2007.

Nokia, et al., "Handover Failure Recovery," 3GPP TSG-RAN WG2 Meeting #58, R2-071717, May 2007.

LG Electronics Inc., "Authentication vector at handover failure," R2-073047, 3GPP TSG-RAN WG2 #59, Aug. 2007.

Qualcomm Europe, ""Shared Secret" for Radio Link Failure Procedure," R2-073299, 3GPP TSG-RAN WG2 #59, Aug. 2007.

Samsung, "Security context transfer for handover between 3GPP and trusted non 3GPP networks", S2-071437, 3GPP TSG SA WG2 Architecture—S2#56c, Mar. 2007.

United States Patent and Trademark Office Application U.S. Appl. No. 12/537,132, Notice of Allowance dated Sep. 5, 2013, 8 pages.

Taiwan Intellectual Property Office Application Serial No. 101105118, Search Report dated Dec. 2, 2013, 3 pages.

Universal Mobile Telecommunications System (UMTS), "Evolved Universal Terrestrial Radio Access (E-UTRA) and Evolved Universal Terrestrial Radio Access (E-UTRAN); Overall description; Stage 2 (3GPP Ts 36.300 version 8.1.0 Release 8)," ETSI TS 136 300 V8.1.0, Jun. 2007, 108 pages.

United States Patent and Trademark Office Application U.S. Appl. No. 13/214,029, Notice of Allowance dated Sep. 12, 2014, 4 pages.

United States Patent and Trademark Office U.S. Appl. No. 14/525,629, Office Action dated Jan. 20, 2016, 12 pages.

\* cited by examiner

PRIOR ART

PRIOR ART

PRIOR ART

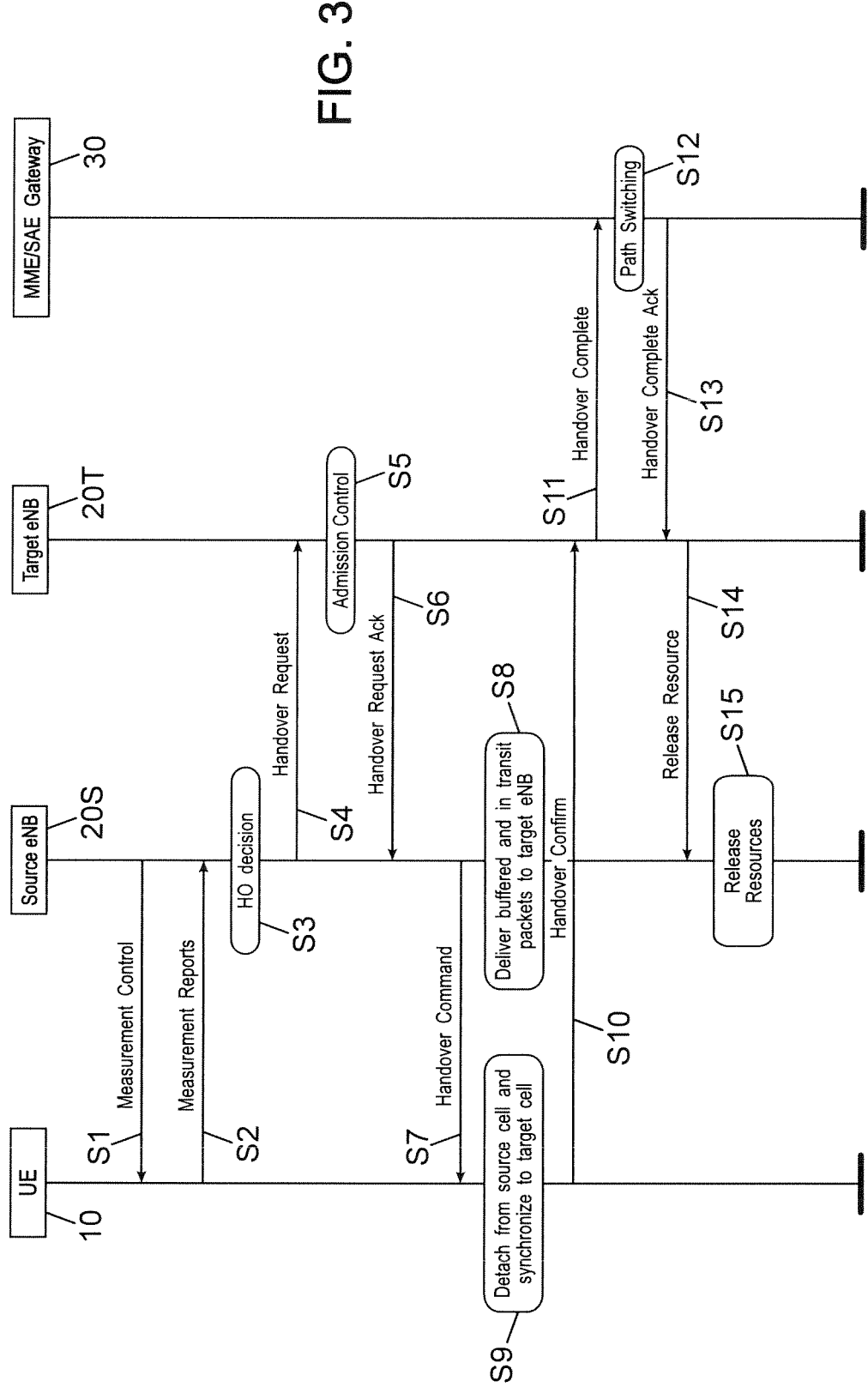

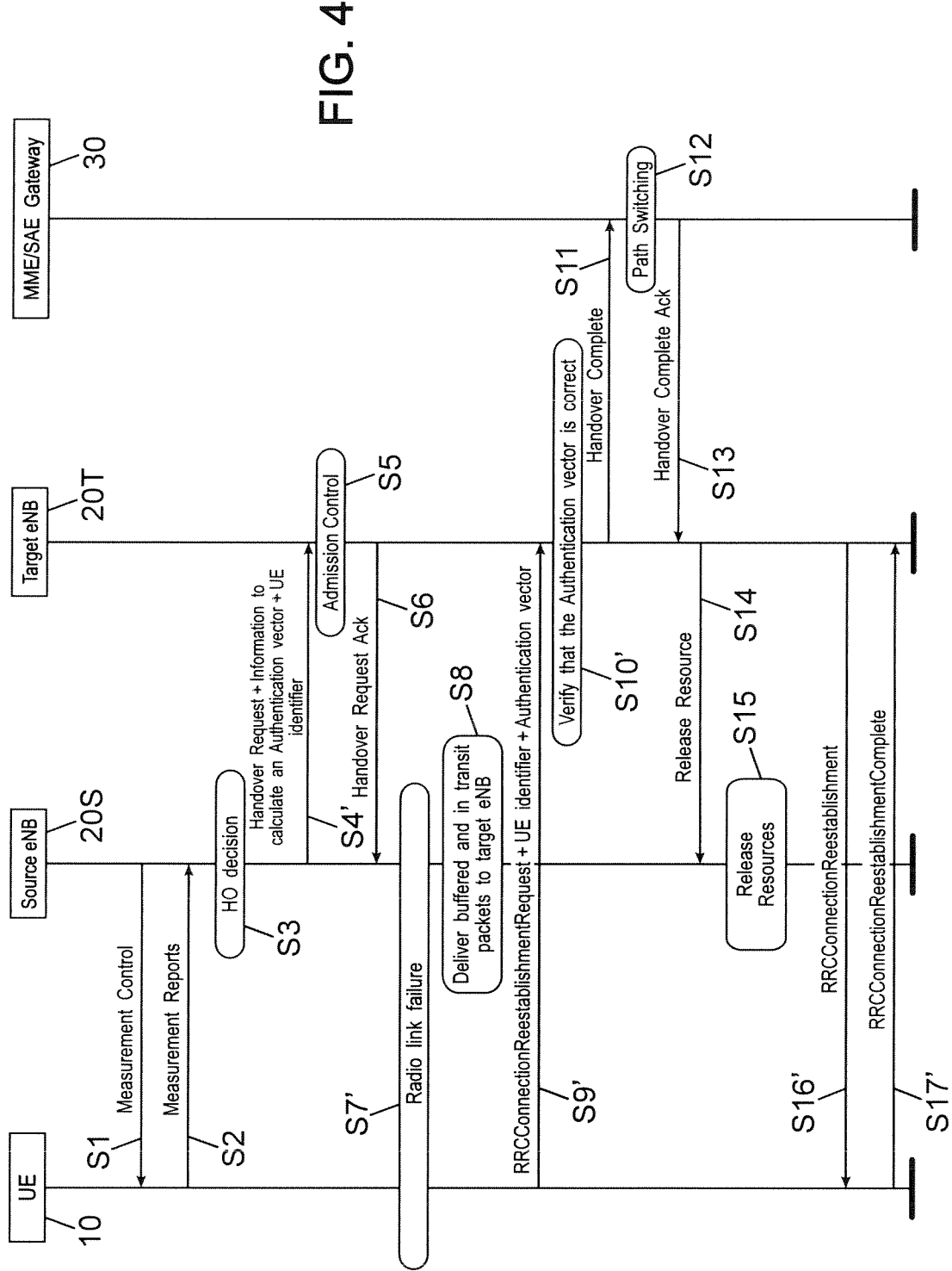

HANDOVER METHOD WITH LINK FAILURE RECOVERY, WIRELESS DEVICE AND BASE STATION FOR IMPLEMENTING SUCH METHOD

CROSS-REFERENCE TO RELATED APPLICATIONS

This application claims priority of U.S. Provisional Application No. 60/955,382 filed on Aug. 12, 2007, the content of which is incorporated herein by reference.

BACKGROUND OF THE INVENTION

1. Field of the Invention

The present invention relates to mobility management for wireless devices in a cellular communications network, and in particular to controlling handover of a wireless device from one cell of the network to another. While it is described below in the context of an LTE ("long term evolution") type of cellular network for illustration purposes and because it happens to be well suited to that context, those skilled in the communication art will recognize that the invention disclosed herein can also be applied to various other types of cellular networks.

2. Discussion of the Related Art

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or More evolved NodeB (eNodeB, or eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity, MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2(a) is a block diagram depicting an architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

As illustrated in FIG. 2(c), the RLC and MAC layers (terminated in an eNodeB 20 on the network side) perform the same functions as for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

FIG. 3 illustrates a typical handover procedure in an LTE system. The handover procedure is made to transfer, or hand off, a pending communication from a source cell, serviced by a source eNodeB 20S, to a target cell, serviced by a target eNodeB 20T. We consider here the case where the source and target cells are not serviced by the same eNodeB.

The source eNodeB 20S configures the UE measurement procedures, which form part of the RRC protocol depicted in FIG. 2(a), according to area restriction information provisioned in each eNodeB. This may be done by sending one or more MEASUREMENT CONTROL messages to the UE 10 in the RRC_CONNECTED state, as illustrated in step S1 of FIG. 3. Measurements requested by the source eNodeB 20S may assist the function controlling the UE's connection mobility. The UE 10 is then triggered to send MEASUREMENT REPORT messages (step S2) according to rules set by e.g. system information broadcast by the source eNodeB and/or specified in the MEASUREMENT CONTROL message or additional downlink signaling.

For each UE in the RRC_CONNECTED state, the source eNodeB 20S runs one or more handover control algorithms whose inputs include the measurements reported by the UE 10 and possibly other measurements made by the source eNodeB 20S. Depending on the measurements, the source eNodeB 20S may decide to hand off the UE 10 to a target eNodeB 20T (step S3 of FIG. 3). When this occurs, the source eNodeB 20S issues a HANDOVER REQUEST message to the target eNodeB 20T (step S4), passing necessary information to prepare the handover on the target side. Such information includes a UE X2 signaling context reference at the source eNodeB, a UE S1 EPC signaling context reference, a target cell identifier, an RRC context and a SAE bearer context. The UE X2 and UE S1 signaling context references enable the target eNodeB to address the source eNodeB and the EPC. The SAE bearer context includes necessary radio network layer (RNL) and transport network layer (TNL) addressing information.

An admission control function may be performed by the target eNodeB 20T depending on the received SAE bearer quality of service (QoS) information to increase the likelihood of a successful handover, if the necessary resources are available at the target eNodeB (step S5 of FIG. 3). If the handover is admitted, the target eNodeB 20T configures the resources according to the received SAE bearer QoS information and reserves a new cell-radio network temporary identifier (C-RNTI) for the sake of identifying the UE 10 in the target cell. The target eNodeB 20T prepares the handover in layers 1 and 2 and sends a HANDOVER REQUEST ACKNOWLEDGE message to the source eNodeB 20S (step S6). The HANDOVER REQUEST ACKNOWLEDGE message includes a transparent container to be passed to the UE 10. The container may include the new C-RNTI allocated by the target eNodeB, and possibly some other parameters such as access parameters, system information blocks (SIBs), etc. The HANDOVER REQUEST ACKNOWLEDGE message may also include RNL/TNL information for the forwarding tunnels, if necessary.

In response, the source eNodeB 20S generates the HANDOVER COMMAND message of the RRC protocol and sends it towards the UE 10 (step S7). In parallel (step S8), the source eNodeB 20S transfers to the target eNodeB 20T part or all of the packets that are buffered for transmission to the UE and currently in transit towards the UE, as well as information relating to acknowledgement status of the packets by the UE.

The HANDOVER COMMAND message includes the transparent container, which has been received from the target eNodeB 20T. The source eNodeB applies the necessary functions of integrity protection and ciphering to the message. The UE receives the HANDOVER COMMAND message with the necessary parameters (new C-RNTI, possible starting time, target eNodeB SIBs etc.) and is thereby instructed by the source eNodeB 20S to perform the handover. The UE 10 complies with the handover command by detaching from the source cell, getting synchronization and accessing the target cell (step S9).

When the UE 10 has successfully accessed the target cell, it sends an HANDOVER CONFIRM message to the target eNodeB 20T using the newly allocated C-RNTI (step S10 in FIG. 3) to indicate that the handover procedure is completed on the UE side. The target eNodeB 20T verifies the C-RNTI sent in the HANDOVER CONFIRM message. If the verification is positive, the EPC is informed by the HANDOVER COMPLETE message from the target eNodeB 20T (step S11) that the UE has changed cell. In step S12, the EPC switches the downlink data path to the target side and it releases any U-plane/TNL resources towards the source eNodeB 20S. The EPC confirms by returning a HANDOVER COMPLETE ACK message in step S13.

The target eNodeB 20T then informs the source eNodeB 20S that the handover was successful by sending a RELEASE RESOURCE message (step S14), which triggers the release of resources, i.e. radio and C-plane related resources associated to the UE context, by the source eNodeB in step S15.

It happens that a UE 10 in the RRC_CONNECTED state, communicating with a given eNodeB 20, undergoes a radio link failure. The UE 10 can then either perform an RRC connection reestablishment procedure to resume the bearer operation with the same eNodeB or a different one, or switch to the RRC_IDLE state and request a new RRC connection when possible. A radio link failure can, in particular, occur between steps S6 and S7 in the handover procedure shown in FIG. 3 (perhaps degradation of the radio link prior to failure was the reason for the handover decision). In such a case, the UE 10 will often end up selecting the right target cell, particularly if the target was selected by the source eNodeB 20S based on channel conditions. Even though the target eNodeB 20T has already obtained all the necessary information about the UE 10 from the source eNodeB 20S, the UE 10 may still have to go via the RRC_IDLE state, which is undesirable as it requires relatively complex procedures involving the EPC.

It has been proposed ("Handover Failure Recovery", R2-071717, 3GPP TSG-RAN WG2 Meeting #58, Kobe, Japan, 7-11 May 2007) to deal with this situation by letting the source eNodeB 20S send to the target eNodeB 20T, in the HANDOVER REQUEST message, the UE identity that may be used in an RRC connection request if the radio link fails, i.e. the identity that is used by the UE when accessing a new cell after the cell selection process. When a radio link failure occurs in the preparation phase of the handover, before the UE 10 has a chance to receive the HANDOVER COMMAND message, and if the UE ends up selecting the cell targeted by the handover procedure, the target eNodeB 20T would then be able to identify the UE and indicate to the UE the possibility to reuse its existing RRC connection instead of setting up a brand new connection and contacting the EPC. In other words, the system would behave as if the handover had been successful.

Thus, instead of transmitting the HANDOVER CONFIRM message to the target eNodeB 20T, the UE 10 undergoing a radio link failure sends an RRC CONNECTION REESTABLISHMENT REQUEST message indicating a UE identifier that the target eNodeB 20T will use in order to identify the UE and to be able to link this UE to the UE context received from the source eNodeB 20S. If the verification is positive, the target eNodeB 20T indicates to the UE 10 that its connection can be resumed (it need not switch to the RRC_IDLE state), by returning a RRC CONNECTION REESTABLISHMENT message.

The UE identifier indicated by the UE and used by the target eNodeB for contention resolution may consist of the C-RNTI associated with a message authentication code for integrity (MAC-I). See "Radio Link Failure Recovery", R2-072382, 3GPP TSG-RAN WG2 Meeting #58, Orlando, U.S.A., 25-29 Jun. 2007. The use of a MAC-I provides some security against intruders that may attempt to use the existing connection of a legitimate user. However, the security is not perfect and in particular intruders may replay the UE identifier transmitted by the legitimate UE to try a fraudulent use of the RRC connection.

An object of the present invention is to enhance security in case of a radio link failure taking place while a handover procedure is being executed.

SUMMARY OF THE INVENTION

A handover method for a wireless communications system is hereby proposed. The system has a plurality of base stations servicing respective cells for communication with wireless devices. The handover method comprises:

for at least one target cell, transmitting a first message from a source base station to a target base station servicing said target cell, the first message including an identifier of a wireless device having a communication link with the source base station and information for obtaining authentication data for said wireless device, wherein the authentication data depends on a secret key available to the wireless device and the source base station and on an identity of said target cell;

upon failure of said communication link, selecting a cell at the wireless device and transmitting, from the wireless device to one of the base stations servicing the selected cell, a reestablishment request message including the identifier of the wireless device and authentication data depending on the secret key and on an identity of the selected cell;

if the selected cell is a target cell serviced by a target base station that received a first message, verifying conformity of the authentication data included in the reestablishment request message with the authentication data obtained from said first message; and transferring the communication link to the selected cell if conformity is verified.

The transmission of the first message, of the HANDOVER REQUEST type, is typically triggered by a handover decision based on measurements reported by the wireless device to the source base station. However, other handover scenarios are also possible.

Due to the possibility of a link failure during execution of the handover procedure, it may be a good idea for the network to prepare more than one target base station in parallel because it reduces the probability of getting the wireless device switched to an idle state and involved in more complex signaling to recover a connection to the network. If the different target base stations use the same authentication data, a security breach may exist. Namely, an intruder that would receive the reestablishment request message including the wireless device identifier and the authentication data sent by the wireless device, e.g. to a target base station "A", could transmit the same message to a different target base station "B" that was also prepared beforehand. Especially in the case where the message would not be received by station "A", this would allow the intruder to fraudulently use the connection of the user. Such a security breach is avoided by making the authentication data, such as a MAC-I for example, dependent on the secret key and the identity of each individual target cell.

Diversification of the authentication data can be further enhanced by using in its calculation a common time reference between the wireless device and each target base station. The authentication data is then calculated in the base station servicing the selected cell upon receipt of the reestablishment request message from the wireless device. If some time has elapsed between the time reference used to generate the authentication data in the wireless device and the current time, connection reestablishment will be denied. This reduces the security risk associated with replay of the same reestablishment request message by an intruder who eavesdrops a message from the legitimate wireless device.

Another aspect of the invention relates to a wireless device for communication with a network having a plurality of base stations servicing respective cells and adapted for implementing a handover method as outlined above. Such a wireless device comprises:
- a detector for detecting failure of a communication link provided between the wireless device and a source base station;
- a selector for selecting a cell for further communication with the network upon detection of the communication link failure;
- a request generator for generating a reestablishment request message including an identifier of the wireless device and authentication data depending on a secret key available to the wireless device and the source base station and on an identity of the selected cell;
- a transmitter adapted for transmitting the reestablishment request message to one of the base stations servicing the selected cell.

Still another aspect of the invention relates to a base station for servicing at least one cell in a wireless communications system and adapted for implementing a handover method as outlined above. Such a base station comprises:
- a network interface adapted for receiving a first message from a source base station of the wireless communications system, the first message including an identifier of a wireless device having a communication link with the source base station and information for obtaining authentication data for said wireless device, wherein the authentication data depends on a secret key available to the wireless device and the source base station and on an identity of a target cell serviced by said base station;
- a wireless interface adapted for receiving a reestablishment request message from a wireless device located in said target cell, the reestablishment request message including an identifier of said wireless device and authentication data; and
- a handover controller for transferring the communication link to said target cell if the wireless device identifier and authentication data included in the reestablishment request message match the wireless device identifier included in the first message and the authentication data obtained from said first message.

BRIEF DESCRIPTION OF THE DRAWINGS

Other objects, features and advantages of the invention will become apparent when reading the following description on non-limiting exemplary embodiments with reference to the accompanying drawings.

FIG. 3 is a diagram illustrating a typical handover procedure in an LTE system.

FIG. 4 is a diagram illustrating a handover procedure in an LTE system, in a case where a failure of the radio link takes place during the procedure.

DETAILED DESCRIPTION OF THE INVENTION

Figure 1:
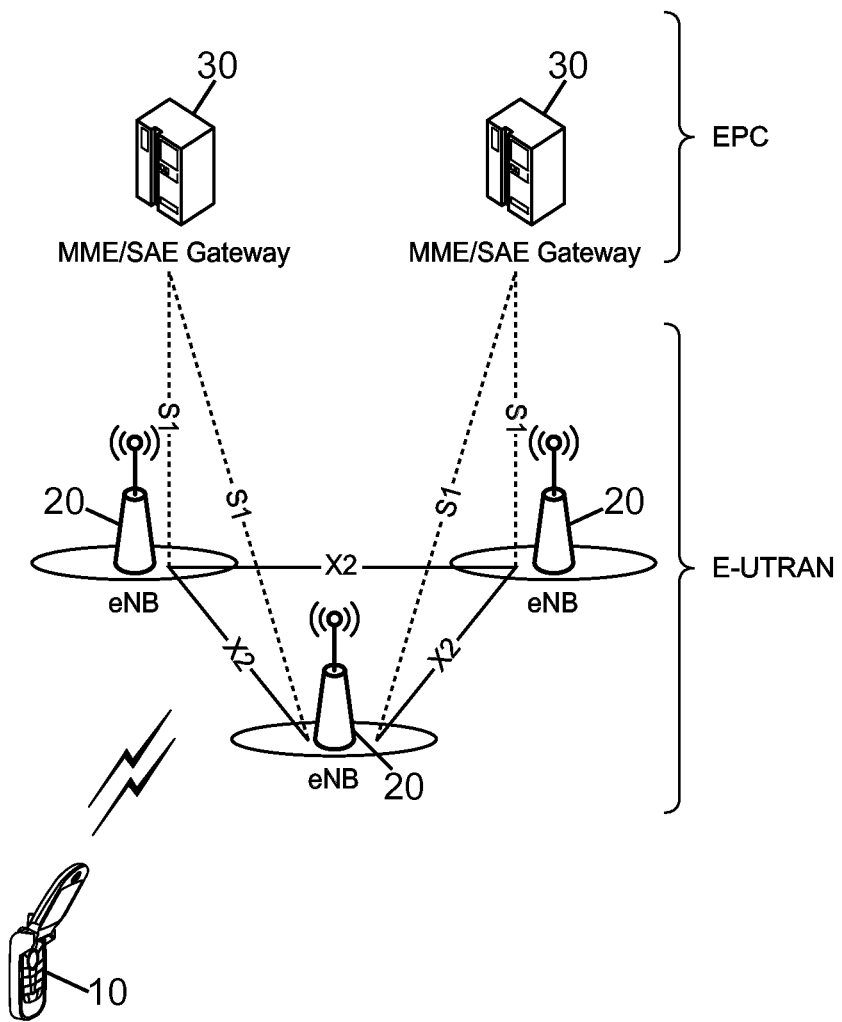
FIG. 1 is a block diagram illustrating network structure of an E-UMTS (or LTE) system.

A handover process in case of radio link failure is depicted in FIG. 4 in the particular, non-limiting context of an LTE system.

The beginning of the procedure up to step S6 is quite similar to that of the procedure discussed above with reference to FIG. 3 and will not be described again here. However, step S4 in which the HANDOVER REQUEST message is transmitted from the source eNodeB 20S to a target eNodeB 20T is modified (step S4') to include in the HANDOVER REQUEST message (or in a separate message sent along with the HANDOVER REQUEST message), in addition to the identifier of the UE 10 for which the handover procedure is initiated, information making it possible to obtain authentication data in the form of an authentication vector. The HANDOVER REQUEST message is received by each target eNodeB 20T by means of its network X2 interface.

It is important to note that the HANDOVER REQUEST message can be sent to several target eNodeBs selected in step S3, in order to cope with the fact that in case of a radio link failure, it cannot be foreseen which eNodeB the UE will select.

How many target cells are taken into account in a given circumstance is a question of configuration of the handover decision algorithms executed by the source eNodeB 20S. If the radio measurements reported by the UE reveal that several eNodeBs may be good candidates for handing off the communication, these eNodeBs could (depending on settings of the handover decision algorithms) be all prepared for handover because they have a non-negligible probability of being selected by the UE in case of radio link failure. In other cases, only one eNodeB will stand as a good candidate for handover and in such a case, the HANDOVER REQUEST message will be sent to only one target eNodeB 20T. But even in the latter case, the HANDOVER REQUEST should preferably be adapted to include the information for obtaining authentication data as described here.

In certain cases, the handover initiation by the transmission of one or more HANDOVER REQUEST message(s) to one or more target eNodeB may be performed without taking into account any measurements reported by the UE. For example, in a cell located in a tunnel and serviced by an eNodeB by means of a loss cable antenna, the network engineers usually expect that the likelihood of a radio link failure prior to reception of the HANDOVER COMMAND message by the UE is fairly high because a UE on board of a moving vehicle will very often fail to make measurements from a target cell located out of the tunnel early enough for the network to complete the handover procedure before the UE has moved out of range of the loss cable antenna. In such a situation, the network engineer also knows the most probable target cell(s) which are those (is that) located at the exit(s) of the tunnel. So it is possible to anticipate and to systematically initiate handover procedures to these most probable target cells, known from the design of the network, by sending respective HANDOVER REQUEST messages to each of their servicing eNodeBs (steps S4' executed in parallel for these eNodeBs).

It is also noted that the modification of the HANDOVER REQUEST message to include information to calculate an authentication vector should preferably be done in all handover scenarios, because the source eNodeB 20S has no way of being sure that the radio link will not fail prior to completion of the handover. If the handover is successful, the authentication vector will simply not be used. So even in the case of FIG. 3 (no radio link failure), step S4 can be changed to step S4'.

Figure 2A:
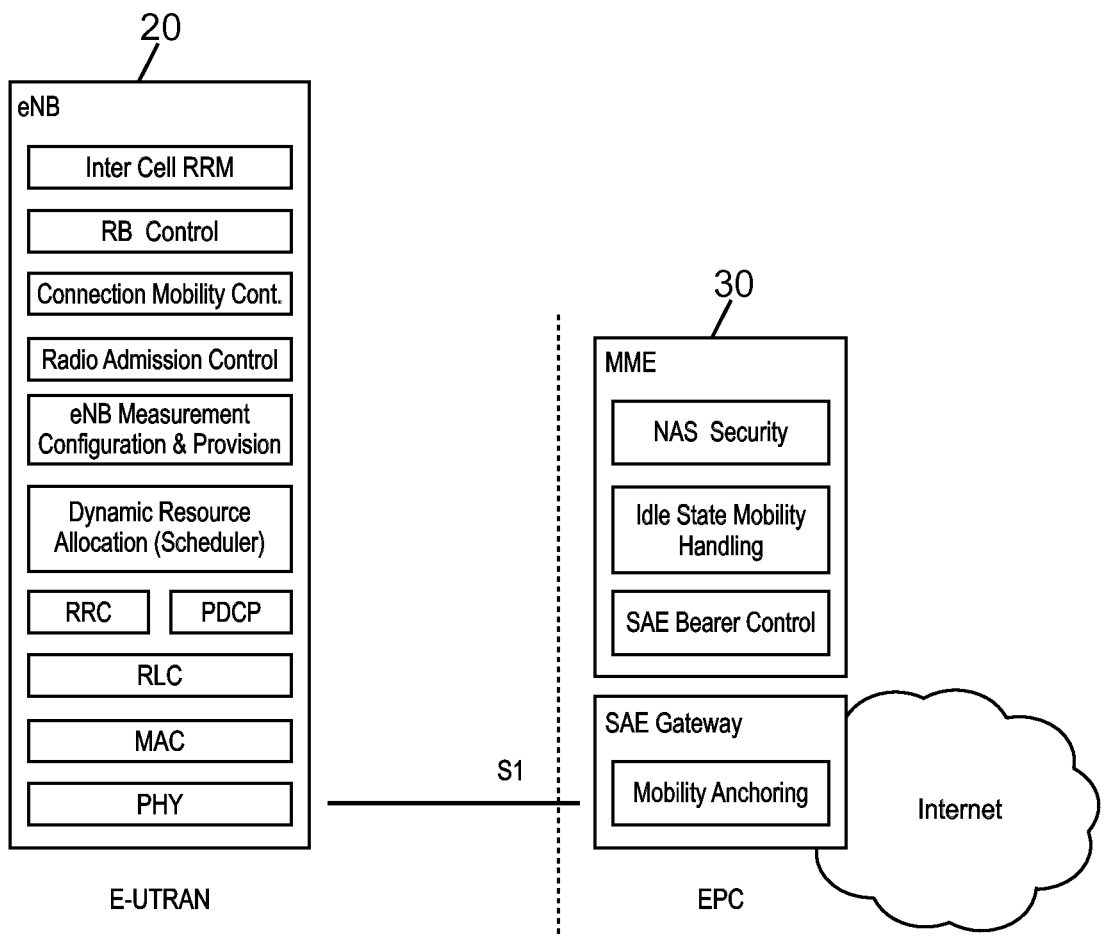
FIGS. 2(*a*), 2(*b*) and 2(*c*) are block diagrams depicting logic architecture of typical network entities of the LTE system (FIG. 2(*a*)), a user-plane (U-plane) protocol stack (FIG. 2(*b*)) and a control-plane (C-plane) protocol stack (FIG. 2(*c*)).
Figure 2B:
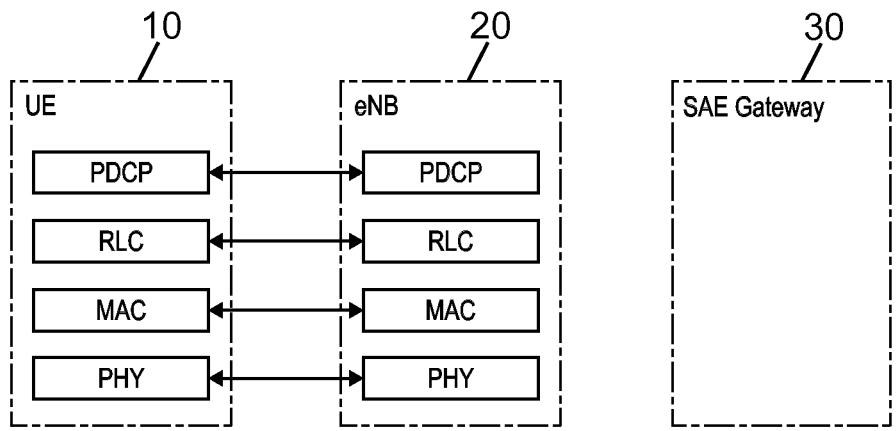

In the scenario of FIG. 4, the HANDOVER COMMAND message cannot be received by the UE 10 because of a radio link failure detected in step S7'. The radio link failure is detected, for example, by means of the RLC/MAC procedures of the user plane as illustrated in FIG. 2(b). Both the UE and eNodeB RLC/MAC entities expect to receive signals at known times and when the signals do not arrive, failure of the radio link can be determined.

At the source eNodeB 20S, detection of the radio link failure can take place before or after transmitting a HANDOVER COMMAND message over the wireless interface. If a HANDOVER COMMAND message was sent, the source eNodeB 20S may transfer to each target eNodeB 20T selected in step S3 part or all of the packets that are buffered for transmission to the UE and currently in transit towards the UE, as well as information relating to acknowledgement status of the packets by the UE (step S8 identical to that described with reference to FIG. 3). The same step S8 can be executed to prepare each selected target cell if the source eNodeB 20S detects the radio link failure prior to transmitting a HANDOVER COMMAND message, as shown in FIG. 4.

When the UE 10 detects the radio link failure, it remains in the RRC_CONNECTED for a while (as long as a timer does not expire), tries to reselect a cell and accesses it by means of the usual random access procedures of the PHY layer. If no cell can be accessed and reselected before expiry of the timer, the UE switches to the RRC_IDLE state. If the same (source) eNodeB is selected, the original link is restored and the handover procedure can be resumed as illustrated in FIG. 3. If a different cell is selected, the UE sends to the eNodeB servicing that cell a message to request the RRC connection to be maintained (step S9'). This message can be an RRC CONNECTION REESTABLISHMENT REQUEST message generated by the RRC entity of the UE in the C-plane (FIG. 2(c)) and transmitted over the wireless interface using the lower RLC, MAC and PHY protocol layers. It includes at least:
- an identifier of the UE; and
- an authentication vector depending on a secret key shared with the source eNodeB 20S and on an identity of the selected cell.

These items may form part of a UE-identity information element (IE) included in the RRC CONNECTION REESTABLISHMENT REQUEST message. The UE-identity IE includes, for example, the C-RNTI used in the source cell as the UE identifier, and a message authentication code for integrity (MAC-I) computed as illustrated in FIG. 5 or FIG. 6 as the authentication vector.

Figure 5:
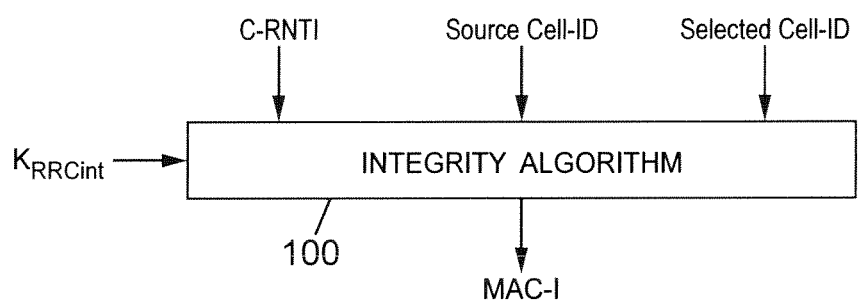
FIGS. 5 and 6 are diagrams illustrating different possible ways of generating authentication vectors in embodiments of the invention.
Figure 6:
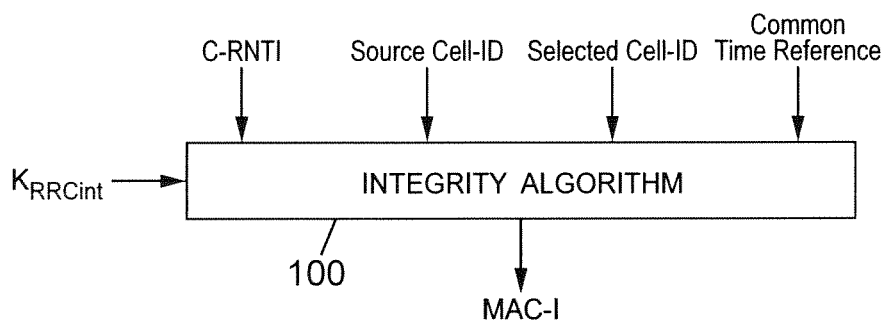

In FIGS. 5 and 6, the MAC-I is calculated by an integrity algorithm 100, which is one of the cryptographic algorithms available in the UEs and eNodeBs and whose input parameters include a secret key shared between the UE 10 and the source eNodeB 20S. This secret key can for example be the $K_{RRCint}$ key used for the protection of RRC traffic with the integrity algorithm 100. The $K_{RRCint}$ key is one of the keys derived from a higher level secret key $K_{eNB}$ available to both the source eNodeB 20S and the UE 10.

The MAC-I is calculated over further input parameters of the integrity algorithm 100 which include at least a selected cell ID. Such cell ID may be a physical layer identity of the selected cell. In the particular example of FIG. 5, the input parameters of the integrity algorithm 100 additionally include:

- the C-RNTI allocated to the UE in the source cell for communication with the source eNodeB 20S on the (failed) radio link;
- a source cell ID, for example the physical layer identity of the source cell.

In such an embodiment, the information transmitted from the source eNodeB 20S to each target eNodeB 20T in the HANDOVER REQUEST message of step S4' in view of the calculation of an authentication vector includes the secret shared between the source eNodeB 20S and the UE 10 (the $K_{RRCint}$ key in our example). If the source C-RNTI of the UE and/or the source cell ID are not provided elsewhere in the HANDOVER REQUEST message, they can also form part of the information for obtaining the authentication vector.

It is observed that it is possible to pre-calculate the MAC-I in the source eNodeB in accordance with FIG. 5, with the physical layer identity of a target cell as the "Selected Cell-ID" input parameter. In this case the information for obtaining the authentication vector (MAC-I) sent with the HANDOVER REQUEST message is reduced to the MAC-I itself, and of course this information is different from one target eNodeB to another when a plurality of target eNodeBs 20T are retained in the handover decision step S3.

In the alternative embodiment of FIG. 6, the input parameters for the integrity algorithm 100 additionally include a common time reference between the UE 10 and the eNodeBs 20 (or at least the eNodeB(s) 20T that is (are) candidate for the handover). The value of this time reference is that of a local clock, for which there is some synchronization between the UE and the network, when the algorithm 100 is run, with a truncation accounting for a certain validity period of the MAC-I.

The RRC CONNECTION REESTABLISHMENT REQUEST message transmitted by the UE 10 in step S9' may be received by an eNodeB which was not prepared for the handover, i.e. which was not contacted by the source eNodeB 20S or which denied admission in step S5. In this case, rejection of the reestablishment request is signaled to the UE 10 that may make another try by selecting another cell and re-transmitting to it another RRC CONNECTION REESTABLISHMENT REQUEST message. If the UE 10 does not receive any response to the RRC CONNECTION REESTABLISHMENT REQUEST message for a certain time, it can switch to the RRC_IDLE state.

Figure 2C:
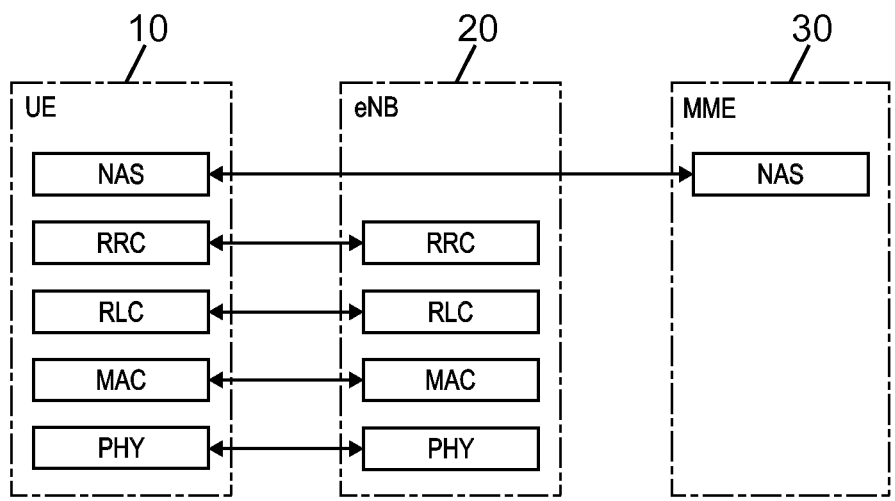

FIG. 4 illustrates the case where the RRC CONNECTION REESTABLISHMENT REQUEST message transmitted by the UE 10 in step S9' is received by a target eNodeB 20T which was prepared for the handover of this UE, by means of its wireless interface and its C-plane protocol layers RRC/RLC/MAC/PHY as illustrated in FIG. 2(c). This target eNodeB 20T then verifies in step S10' whether the authentication vector included in the RRC CONNECTION REESTABLISHMENT REQUEST message matches the authentication vector obtained from the HANDOVER REQUEST message in step S4'.

If the authentication vector was not received directly from the source eNodeB 20S on the X2 interface, it is calculated by the target eNodeB 20T as shown in FIG. 5 or 6 using the information received in the HANDOVER REQUEST message and the ID of the cell accessed by the UE.

If the input parameters include a common time reference as shown in FIG. 6, the calculation is done locally by the target eNodeB 20T at the time of receiving the RRC CONNECTION REESTABLISHMENT REQUEST message, so that the time reference is normally the same as used on the UE side. Therefore, if the RRC CONNECTION REESTABLISHMENT REQUEST message received by the target eNodeB 20T is a message fraudulently replayed by an intruder, the update of the common time reference between the original generation of the MAC-I in the legitimate UE and its calculation in the target eNodeB 20T causes a mismatch so that the reestablishment request is rejected.

Also, if the RRC CONNECTION REESTABLISHMENT REQUEST message was first sent towards a different cell selected by the legitimate UE, the dependence of the MAC-I on the selected cell ID prevents success of a fraudulent replay to a target eNodeB 20T, without any timing constraints.

When the conformity of the authentication vectors is verified in step S10', the handover control function of the target eNodeB 20T transfers the communication link of the UE to the selected target cell by:

triggering continuation of the handover procedure with steps S11 to S15 shown in FIG. 4, which are identical to those having the same reference signs in FIG. 3; and after receiving the HANDOVER COMPLETE ACK message from the EPC (step S13) completing the RRC connection reestablishment procedure by returning to the UE 10 an RRC CONNECTION REESTABLISHMENT message in step S16'. The UE 10 responds by returning an RRC CONNECTION REESTABLISHMENT COMPLETE message in step S17'.

In the embodiment illustrated in FIG. 4, the delivery of the buffered and in transit packets from the source eNodeB 20S to the target eNodeB 20T over the X2 interface (step S8) is done as soon as the source eNodeB 20S receives the HANDOVER REQUEST ACKNOWLEDGE message of step S6. Alternatively, when a radio link failure is detected in step S7', the source eNodeB 20S may wait for some indication that the UE 10 has successfully accessed a target eNodeB 20T and authenticated itself. In such an alternative, the target eNodeB 20T that verified conformity of the authentication vector in step S10' can contact the source eNodeB 20S, before or after receiving the HANDOVER COMPLETE ACK message from the EPC, in order to recover the buffered and in transit packets.

Embodiments of the invention have been disclosed above in the illustrative case of a 3GPP LTE system. Those skilled in the wireless communication art will appreciate that various modifications can be brought to these embodiments without departing from the invention and from the attached claims. They will also appreciate that the invention is applicable to communications systems other than 3GPP LTE systems.

What is claim is:

1. A handover method for a wireless communications system having a plurality of base stations servicing respective cells for communication with wireless devices, the method comprising:

for at least one target cell, transmitting a first message from a source base station to a target base station servicing said target cell, the first message including an identifier of a wireless device having a radio link with the source base station and information for obtaining a first message authentication code for integrity (MAC-I) for said wireless device, wherein the first MAC-I depends on a secret key available to the wireless device and the source base station and on an identity of said target cell;

upon failure of said radio link, selecting a cell at the wireless device and transmitting, from the wireless device to one of the base stations servicing the selected cell, a reestablishment request message requesting a reestablishment of a radio link, wherein the reestablishment request message includes the identifier of the wireless device and a second MAC-I depending on the secret key and on an identity of the selected cell;

if the selected cell is a target cell serviced by the target base station that received the first message, verifying conformity of the first MAC-I and the second MAC-I; and transferring the radio link to the selected cell if the conformity is verified.

2. The handover method as claimed in claim 1, wherein the first MAC-I is calculated using a cryptographic algorithm based on input parameters including the secret key and a target cell identity.

3. The handover method as claimed in claim 2, wherein said input parameters further include at least one of an identity of a source cell serviced by the source base station and a temporary identifier allocated to the wireless device for communication with the source base station on the radio link.

4. The handover method as claimed in claim 2, wherein said input parameters further include a common time reference between the wireless device and each target base station, and wherein the first MAC-I is calculated in the base station servicing the selected cell upon receipt of the reestablishment request message from the wireless device.

5. The handover method as claimed in claim 1, wherein the first MAC-I is calculated in the target base station based on at least part of the contents of the first message received from the source base station and compared to the second MAC-I included in the reestablishment request message.

6. The handover method as claimed in claim 1, wherein the first MAC-I is calculated in the source base station and transferred to the target base station for comparison to the second MAC-I included in the reestablishment request message.

7. A user equipment (UE) for communication with a network having a plurality of base stations servicing respective cells, the UE comprising:

a detector for detecting radio link failure between the UE and a source base station;

a selector for selecting a cell for further communication with the network upon detection of the radio link failure;

a request generator for generating a reestablishment request message to request a reestablishment of a radio link after the detection of the radio link failure, a transmitter adapted for transmitting the reestablishment request message to one of the base stations servicing the selected cell, wherein the reestablishment request message includes an identifier of the UE and a message authentication code for integrity (MAC-I) depending on a secret key available to the UE and the source base station and on an identity of the selected cell, and wherein the MAC-I is to be used for verifying the UE at the selected cell.

8. The UE as claimed in claim 7, wherein the MAC-I is calculated using a cryptographic algorithm based on input parameters including the secret key, the identity of the selected cell and a common time reference between the UE and at least one of the base stations.

9. A base station for servicing at least one cell in a wireless communications system for communication with wireless devices, the base station comprising:

a network interface adapted for receiving a first message from a source base station of the wireless communications system, the first message including an identifier of a wireless device having a radio link with the source base station and information for obtaining a first message authentication code for integrity (MAC-I) for said wireless device, wherein the first MAC-I depends on a secret key available to the wireless device and the source base station and on an identity of a target cell serviced by said base station;

a wireless interface adapted for receiving a reestablishment request message from a wireless device when a radio link failure has occurred, the reestablishment request message including an identifier of said wireless device and a second MAC-I for said wireless device, wherein the second MAC-I depends on the secret key available to the wireless device and the source base station and on an identity of a selected cell selected by the wireless device; and a handover controller for transferring the communication link to said target cell if the wireless device identifier and the second MAC-I included in the reestablishment request message match the wireless device identifier and the first MAC-I obtained from said first message, wherein the reestablishment request message is received in order to permit a reestablishment of the radio link between the wireless device and the source base station.

10. The base station as claimed in claim 9, wherein the second MAC-I is calculated locally using a cryptographic algorithm based on input parameters including the secret key and the identity of the selected cell.

11. The base station as claimed in claim 10, wherein said input parameters further include at least one of an identity of a source cell serviced by the source base station and a temporary identifier allocated to the wireless device for communication with the source base station on the radio link.

12. The base station as claimed in claim 10 or 11, wherein said input parameters further include a time reference corresponding to reception of the reestablishment request message from the wireless device.

13. A method for communicating with a network having a plurality of base stations servicing respective cells, the method being performed at a user equipment (UE), the method comprising:

detecting radio link failure between the UE and a source base station;

selecting a cell for further communication with the network after detection of the radio link failure;

generating a reestablishment request message to request a reestablishment of a radio link after detection of the radio link failure; and transmitting the reestablishment request message to one of the base stations servicing the selected cell, wherein the reestablishment request message includes an identifier of the UE and a message authentication code for integrity (MAC-I) depending on a secret key available to the UE and the source base station and on an identity of the selected cell, and wherein the MAC-I is to be used for verifying the UE at the selected cell.

* * * * *